March 24, 1959  F. A. ROBERTON ET AL  2,879,074
WHEEL ADJUSTMENT FOR MOWERS
Filed Oct. 29, 1956
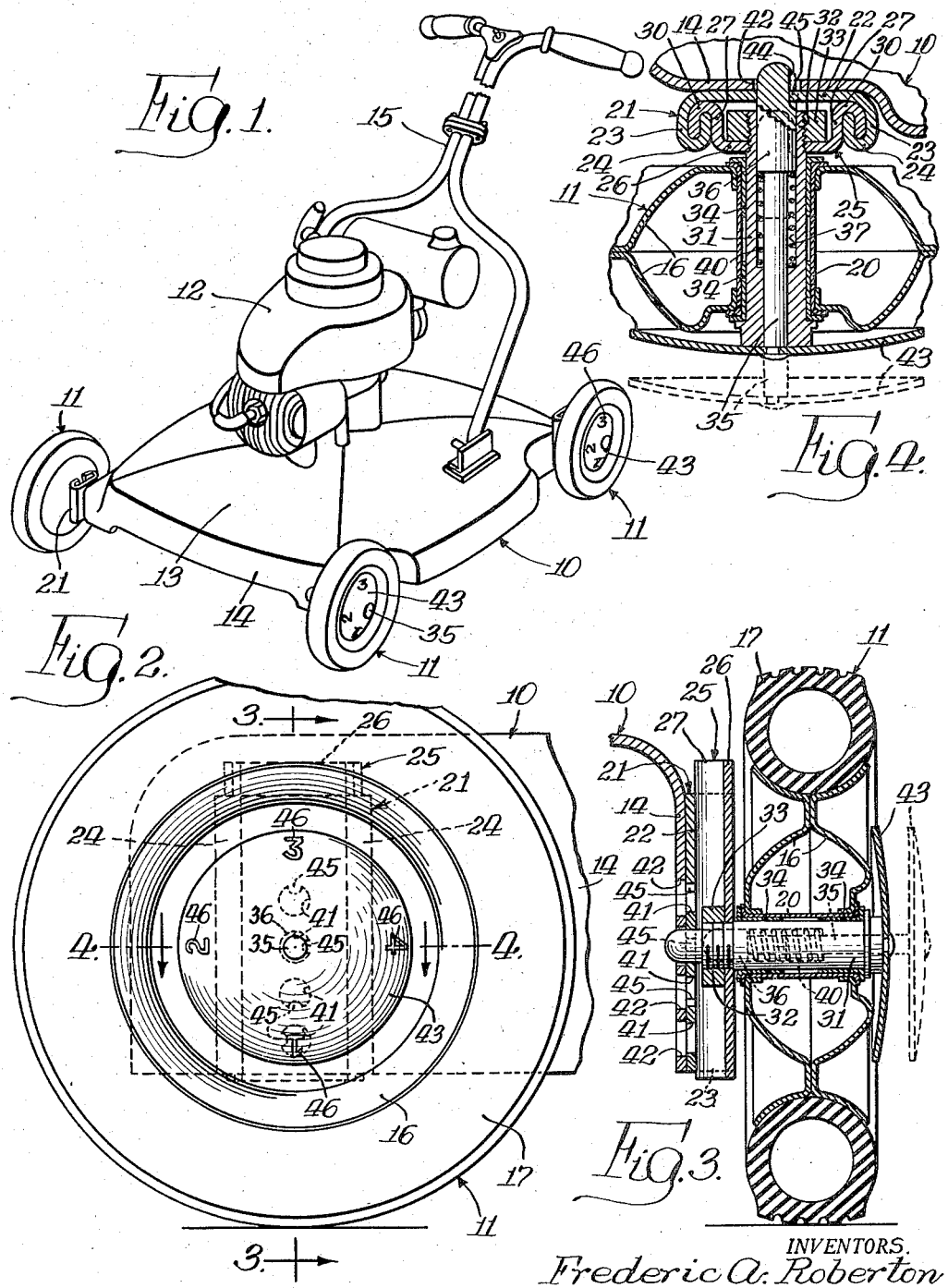
INVENTORS.
Frederic A. Roberton
BY Harold T. Bright
Davis, Lindsey, Hibben & Noyes
Atty's.

United States Patent Office 2,879,074
Patented Mar. 24, 1959

2,879,074

WHEEL ADJUSTMENT FOR MOWERS

Frederic A. Roberton, Oak Park, and Harold T. Bright, Elmhurst, Ill., assignors to Roberton Manufacturing Co., Chicago, Ill., a corporation of Illinois Application October 29, 1956, Serial No. 618,919

9 Claims. (Cl. 280—43)

The invention relates generally to wheel adjustment for power mowers and more particularly to a wheel adjustment for a mower of the type having a blade mounted for rotation about a vertical axis.

A mower of the foregoing type usually comprises a casing or frame structure within which a blade is mounted for rotation in a horizontal plane. To drive the blade, a motor such as a gasoline engine is mounted on the casing and its shaft extends downwardly into the casing and has the blade mounted on the lower end thereof. The casing is usually supported on wheels adapted to roll on the ground, and the wheels are usually adjustable on the casing to vary the height of cut effected by the mower.

The general object of the present invention is to provide a novel support for such wheels, which is easily adjusted for different heights of cut and provides a readily visible indication of the height for which it is adjusted.

Another object is to provide a novel adjustable support for a wheel of a mower of the foregoing type, which support rigidly holds the wheel in the desired adjusted position.

Other objects and advantages will become apparent from the following description taken in connection with the accompanying drawing, in which:

Fig. 1 is a perspective view of a mower provided with a wheel adjustment embodying the features of the invention;

Fig. 2 is an enlarged side elevational view of a portion of the mower, showing one of its wheels;

Fig. 3 is a vertical sectional view taken on the line 3—3 of Fig. 2; and

Fig. 4 is a horizontal sectional view taken on the line 4—4 of Fig. 2.

A mower of the type herein contemplated is adapted for mowing lawns and comprises a casing, indicated generally at 10, supported for movement over the lawn by a plurality of wheels, each indicated generally at 11. For effecting the cutting action, the mower has a blade (not shown) adapted to rotate in a horizontal plane under the casing 10. To drive the blade, a motor, such as a small gasoline engine 12, is mounted on the top of the casing 10 and has its drive shaft extending downwardly into the casing to support and rotate the blade. In the present instance, the casing 10 is shown as generally rectangular in form and having a top wall 13 merging into a downwardly extending side wall or skirt 14. To move the mower, a handle 15 is pivotally attached to the top wall 13 of the casing. In the form of mower illustrated, four wheels 11 are shown, mounted at the four corners of the casing 10. Each wheel is shown as comprising a pair of shaped, sheet-metal disc members 16 formed at their periphery to receive a rubber tire 17 and centrally perforated for securing them to a tubular hub 20.

The vertical position of the wheels 11 on the casing determines the height at which the grass is cut, and to provide for cutting at different heights, the wheels are adjustably secured to the casing. For this purpose, an adjustable wheel mounting means is provided, comprising generally a vertically extending track member adapted to be secured to the casing 10, a wheel supporting member mounted on the track for vertical adjustment thereon, an axle for the wheel extending from the wheel supporting member and on which a wheel 11 is mounted, and means for locking the wheel supporting member in its various positions of vertical adjustment.

In the embodiment of the invention illustrated in the drawing, the track member is indicated generally at 21 and in its preferred form it comprises a vertically positioned channel having a web portion 22 rigidly secured flatwise to the skirt 14 of mower casing 10 as by welding, with the flange portions 23 projecting outwardly from the casing. The flange portions 23 of the channel are reversely bent inwardly of the channel, as at 24. Cooperating with the track member 21 is a wheel supporting member, indicated generally at 25, which is movably mounted on the track member 21 and which is also of channel form comprising a web portion 26 and a pair of flange portions 27 extending inwardly toward the track member 21. The flange portions 27 of the wheel supporting member 25 are also reversely bent but outwardly of the channel, as at 30, and intermesh with the reversely bent flange portions 23 of the track member 21. The wheel supporting member 25 is preferably of greater length than the track member 21 so that a substantial portion of its length will be in contact with the track member for all positions of adjustment, and the intermeshing of the flange portions 23 and 27 of the two members permits the wheel supporting member to readily slide in the track member but holds the wheel supporting member against tilting either in the plane of the track member or sidewardly of said plane.

To mount the wheel 11 on the wheel supporting member 25, the latter is provided with a central perforation in its web portion 26, and an axle 31 provided with a reduced inner end portion 32 extends therethrough. The inner end portion 32 is threaded and a nut 33 is mounted thereon to rigidly secure the axle 31 to the wheel supporting member. The axle 31 extends perpendicularly outward from the wheel supporting member to support the hub 20 of the wheel, and in this instance bushings 34 are provided between the hub 20 and axle 31 at each end of the hub.

The preferred embodiment of the invention also includes means for locking the wheel supporting member 24 in its various positions of adjustment on the track member 21. The locking means includes an indicator for indicating the position of adjustment in which the wheel supporting member is locked. To this end, the axle 31 is tubular in form and is provided with an axially movable locking pin 35 mounted therein. The locking pin 35 is provided at its inner end with an enlarged head 36 slidable in a counterbore 37 in the axle. A spring 40 is also mounted in the counterbore 37 and bears against the enlarged head 36 of the locking pin, tending to force the pin inwardly toward the track member 21. The web portion 22 of the track member 21 is provided with a series of vertically aligned holes 41 so that the enlarged head 36 of the locking pin may be selectively inserted therein. To insure full entry of the enlarged head 36 of the locking pin into the holes 41, the skirt 14 of the mower casing may also be provided with corresponding holes 42 registering with the holes 41. The holes 42 are preferably slightly larger than the holes 41 to avoid the necessity of accurately aligning the two sets of holes in securing the track member to the casing. Manual means is provided for withdrawing the locking pin 35 from the holes 41, and in the present instance the manual means comprises a disc 43 mounted on the outer end of the locking pin 35 at the outer end of the axle 31.

With this construction, the disc 43 may be grasped and the enlarged head 36 of the locking pin may be withdrawn from the hole 41 in which it is positioned. The wheel 11 together with the wheel supporting member 25 may then be moved vertically to position the locking pin opposite another one of the holes 41. On release of the disc 43, the spring 40 forces the enlarged head 36 of the locking pin into the hole 41. The wheel 11 is thus held in its adjusted position.

As heretofore mentioned, the structure also includes means for indicating which adjusted position the wheel 11 is in. For this purpose, the locking pin 31 is rotatable and is permitted to enter each hole 41 only in one rotative position, the rotative positions for the different positions of adjustment being different. To permit the locking pin to enter a hole 41 in only one rotative position, the enlarged head 36 and the holes 41 are provided with cooperating means comprising, in this instance, a longitudinal groove 44 cut in one side of the enlarged head 36 and a lug 45 formed on the track member and projecting into the hole 41. The lugs 45 for the respective holes 41 are in different rotative positions, in this instance 90 degrees apart from each other, so that the locking pin must be rotated through 90 degrees when moved from one hole 41 to enter the next hole.

To indicate the rotative position of the locking pin and hence indicate the hole that it can enter, the disc 43 is provided with indicia in the form of numerals 46 placed on the outer face of the disc 43. In the present instance there are four holes 41 and four such numerals 46 placed 90 degrees apart, and the one at the top of the disc in a right-side-up position indicates the position of the locking pin. Thus, in Fig. 2, it will be noted that the numeral 3 is at the top of the disc and the locking pin is rotated into position to enter the third hole 41 from the bottom of the series of holes.

From the foregoing description, it will be apparent that we have provided a novel support for the wheels of a mower of the type mentioned, which can be easily adjusted for different heights of cut and provides a readily visible indication of the height for which it is adjusted. The support rigidly holds the wheel in the desired adjusted position and prevents the wheel from tilting.

I claim:

1. An adjustable wheel mounting means for a mower of the character described, comprising a vertically extending track member adapted to be rigidly mounted on the casing of the mower, a wheel supporting member movably mounted on said track for vertical adjustment thereon, a wheel having a tubular axle mounted on said wheel supporting member, and means extending axially through the tubular axle of said wheel and engageable with said track for locking said wheel supporting member to said track in various positions of adjustment.

2. An adjustable wheel mounting means according to claim 1, in which a spring coacts with said locking member for urging it into engagement with said track.

3. An adjustable wheel mounting means for a mower of the character described, comprising a vertically extending track member adapted to be rigidly mounted on the casing of the mower, a wheel supporting member movably mounted on said track for vertical adjustment thereon, a tubular axle extending from said wheel supporting member, a wheel rotatably mounted on said axle, a locking pin slidably and rotatably mounted in said axle, said track having a plurality of vertically aligned holes adapted selectively to receive the inner end of said pin, said locking pin and each of said holes having cooperating means permitting said inner end to enter the hole in only one rotative position with the cooperating means in the respective holes being angularly offset from one another, and a disc rigidly mounted on the other end of said locking pin for rotating the pin, said disc having indicia for indicating its rotative position and thereby indicating which hole said locking pin is rotatively positioned to enter.

4. An adjustable wheel mounting means for a mower of the character described, comprising a vertically extending track member adapted to be rigidly mounted on the casing of the mower, a wheel supporting member movably mounted on said track for vertical adjustment thereon, a tubular axle extending from said wheel supporting member, a wheel mounted on said axle, rotatably adjustable means extending through said axle and coacting with said track for holding said wheel supporting member in various positions of vertical adjustment, and a manually operable member mounted at the outer side of the wheel for rotatably adjusting said adjustable means and having indicia for indicating the rotative position of said adjustable means.

5. An adjustable wheel mounting means for a mower of the character described, comprising a vertically extending track member adapted to be rigidly mounted on the casing of the mower, a wheel supporting member movably mounted on said track for vertical adjustment thereon, each of said members is a channel, with the flange portions of the channels wrapped around each other and intermeshing to hold said wheel supporting member against tilting both in plane of said track and sidewardly from said plane, an axle rigidly secured to said wheel supporting member and extending perpendicularly therefrom, and means for locking said wheel supporting member to said track member in various positions of adjustment.

6. An adjustable wheel mounting means according to claim 5, in which each of said members is a channel, the flange portions of one member being reversely bent inwardly of the channel and the flange portions of the other member being reversely bent outwardly of the channel, the reversely bent flanges of the two members intermeshing with each other to hold the wheel supporting member against tilting.

7. An adjustable wheel mounting means for a mower of the character described, comprising a vertically extending track member adapted to be rigidly mounted on the casing of the mower, said track member having a plurality of vertically aligned holes formed therein, a wheel supporting member movably mounted on said track member for vertical adjustment thereon and having a tubular axle extending therefrom for supporting the wheel, and a locking member extending axially through said axle and being adapted at its inner end to enter said holes selectively for the various positions of adjustment.

8. An adjustable wheel mounting means for a mower of the character described, comprising a vertically extending track member, said track member having a plurality of vertically aligned holes therein and being adapted to be rigidly mounted on the casing of the mower, a wheel supporting member slidably mounted on said track member for vertical adjustment thereon and having a tubular axle extending therefrom for supporting the wheel, and a locking member disposed in and extending through said axle and engageable at its inner end with said track member for locking said wheel supporting member to said track member in various positions of adjustment, said locking member having cooperating means permitting said inner end to enter a hole in only one rotative position with the cooperating means in the respective holes being angularly offset from one another, said locking member being rotatably mounted in said axle to register with the respective holes.

9. An adjustable wheel mounting means for a mower of the character described, comprising a vertically extending track member adapted to be rigidly mounted on the casing of the mower, said track member having a plurality of vertically aligned holes formed therein, a wheel supporting member movably mounted on said track member for vertical adjustment thereon, said wheel supporting member having a tubular axle extending therefrom for supporting the wheel, and a rotatably mounted locking member extending axially through said tubular axle, said locking member and said track member having cooperating means permitting said inner end to enter said holes selectively for the various positions of adjustment.

References Cited in the file of this patent

UNITED STATES PATENTS

| | | |
|---|---|---|
| 2,338,351 | Parrish | Jan. 4, 1944 |
| 2,577,885 | Gay | Dec. 11, 1951 |
| 2,748,553 | Funk | June 5, 1956 |

FOREIGN PATENTS

| | | |
|---|---|---|
| 608,965 | Great Britain | Sept. 23, 1948 |
| 688,283 | Great Britain | Mar. 4, 1953 |